MICROWAVE SPARK-GAP SWITCH HAVING A TRIGGER ELECTRODE CENTERED BETWEEN AND ALIGNED WITH THE OPPOSED ELECTRODE

Filed May 21, 1965

INVENTORS
HERMAN FARBER
MAX SUCHER

BY Kenyon, Palmer, Stewart & Estabrook

ATTORNEY

United States Patent Office 3,351,806
Patented Nov. 7, 1967

3,351,806

MICROWAVE SPARK-GAP SWITCH HAVING A TRIGGER ELECTRODE CENTERED BETWEEN AND ALIGNED WITH THE OPPOSED ELECTRODE

Herman Farber, Bellerose, and Max Sucher, Levittown, N.Y., assignors to Polytechnic Institute of Brooklyn, Brooklyn, N.Y., a corporation of New York
Filed May 21, 1965, Ser. No. 457,567
2 Claims. (Cl. 315—39)

This invention relates to switches and more particularly to D.C. triggered, high speed, high power, microwave spark-gap switches.

There are numerous instances in the microwave art in which rapid switching of high peak pulsed microwave powers is of considerable technical importance. It has previously been proposed to utilize a microwave spark-gap, the breakdown of which is triggered by a pulse of intense ultra-violet light. While nanosecond switching times are possible with a gap triggered by ultra-violet light, the RF power levels which can be reliably switched are restricted to values which approximate the self breakdown power of the spark-gap. Self breakdown power may be defined as the minimum peak pulsed power at which an occasional breakdown of the gap will occur in the absence of an external triggering source. This, in turn, tends to limit the pulse width to narrow pulses.

Accordingly, it is the principal object of the present invention to provide a microwave spark-gap which is triggered by a short high voltage D.C. pulse in order to facilitate rapid switching of high peak pulsed microwave power over a wide range of RF power levels and pulse widths.

Other objects of the present invention will be apparent to those skilled in this art when considering the following detailed description in conjunction with the attached drawings in which.

Figure 2:
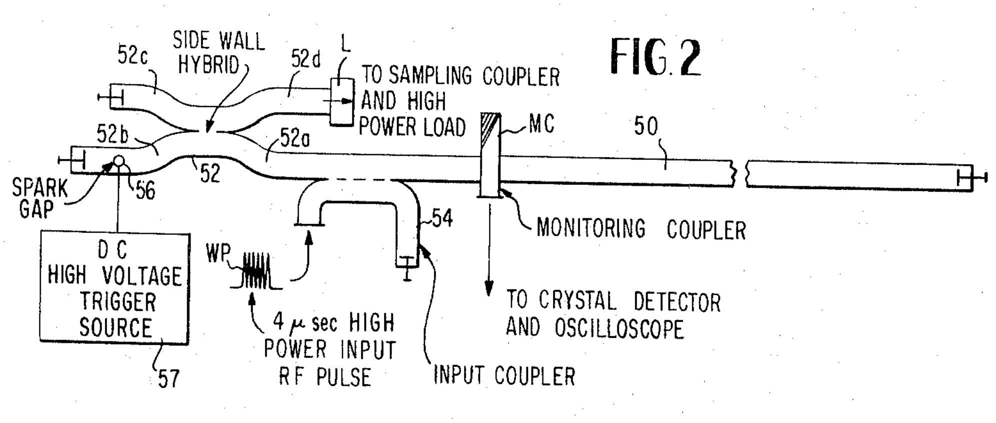
FIGURE 2 shows schematically an arrangement utilizing a gap of the type shown in FIGURE 1 in apparatus for achieving a high power RF pulse compression by switching power into and out of a storage cavity.
Figure 2A:
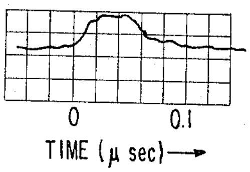

FIGURE 2*a* shows the output waveform of the arrangement shown in FIGURE 2; and

Figure 1:
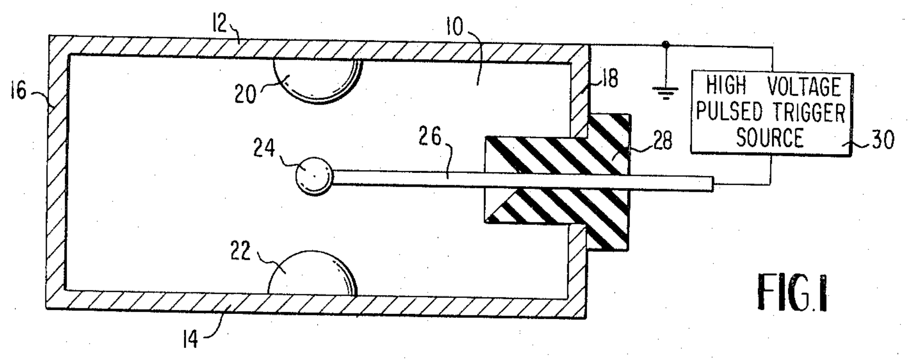
FIGURE 1 is a sectional view through a rectangular wave guide showing the basic design of a D.C. triggered microwave spark-gap in accordance with the present invention.
Figure 3:
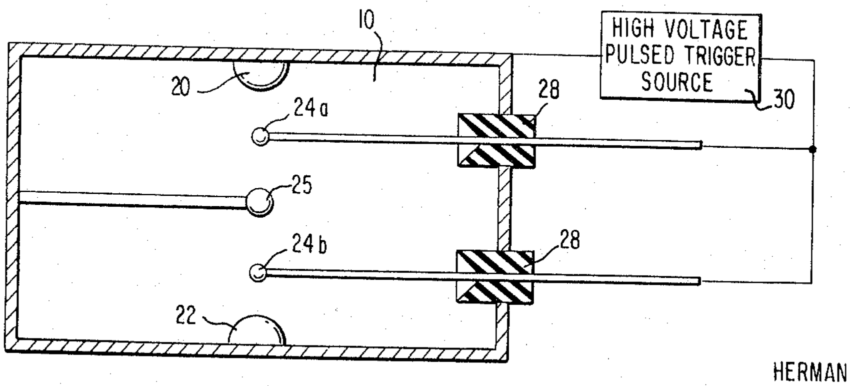

FIGURE 3 is a view similar to FIGURE 1 but showing an alternative electrode arrangement useful in connection with larger sizes of wave guide.

In general, the objects of the present invention are achieved by providing a pair of opposed electrodes in electrical conducting relation with and supported on opposite walls of a wave guide and positioning a trigger electrode substantially equidistant from the pair of electrodes, the trigger electrode being supported by a side wall of the same wave guide and insulated therefrom.

The oppositely positioned electrodes are located on an axis parallel with the electric field within the wave guide, and the wave guide section containing these electrodes is filled with an ionizable gas, preferably air, at or near atmospheric pressure, or at a pressure to insure a thin line discharge, as distinguished from a diffused discharge, between the trigger electrode and each of the main electrodes.

A high voltage pulsed D.C. source is connected between the trigger electrode and the wave guide itself.

The application of a triggering pulse to the trigger electrode establishes a concentrated or thin line spark discharge between the trigger electrode and the main electrodes, and this discharge converts the normal capacitance of the spark-gap region into an equivalent lumped inductance.

Referring first to FIGURE 1 which shows the basic design of a microwave spark-gap in accordance with the present invention as it is applied to a rectangular section waveguide, the guide 10 includes broad walls 12 and 14 and narrow walls 16 and 18. Positioned on the broad walls 12 and 14 are hemispherical electrodes 20 and 22 which electrodes lie in substantially the same vertical plane. The trigger electrode 24 is supported on an arm 26 which extends through a side wall 18 of the guide and is supported thereon by means of an insulating bushing 28.

The hemispherical shape of the electrodes 20 and 22 and the spherical shape of the trigger electrode 24 is illustrative but not critical. For example, the electrodes 20 and 22 could be cylindrical with rounded edges or shoulders on the facing ends. Likewise, the trigger electrode 24 could be either cylindrical or ellipsoidal. Preferably, however, the diameter of the trigger electrode 24 is only slightly greater than the diameter of the supporting rod 26. This geometrical relationship between the trigger electrode 24 and the support rod 26 is useful in preventing discharge between the rod and the electrodes 20 and 22.

As shown in FIGURE 1, a high voltage pulsed trigger source 30 is connected between the wave guide 10 and the supporting rod 26 for the trigger electrode 24.

With the structure shown in FIGURE 1 and utilizing a pulsed high voltage D.C. field, of about 10 nanoseconds duration, and applied in a direction parallel to the RF field within the guide, and with the pulsed field sufficiently intense to breakdown the gap without assistance from the RF field, the discharge can be indefinitely maintained by the RF field alone at high powers, or by a reduced D.C. field at lower powers. The D.C. trigger switch, therefore, can operate over a wide range of power levels and pulse widths which is not true of the ultraviolet triggered gap.

With the configuration shown in FIGURE 1 an intense concentrated spark is obtained. The resulting channel of ionized gas converts the equivalent lumped capacitance of the central gap region to an equivalent inductance. This sudden change in circuit reactance accounts for the good microwave switching characteristics of the gap configuration. It should be pointed out that the gap of the present invention is designed primarily for operation in wave guides filled with air at normal (i.e., atmospheric) pressures, or higher. Gases other than air could be used.

FIGURE 2 shows a particular application for the microwave spark-gap of FIGURE 1. The circuitry shown in FIGURE 2 is useful in connection with the spark-gap of the present invention to provide for a high degree of pulse compression at a greatly increased amplitude. The basic components of the circuit or network shown in FIGURE 2 include a resonant storage cavity in the form of a wave guide 50 connected to one arm **52*a* of a sidewall hybrid 52**.

Microwave energy pulses represented at WP are supplied from a suitable source to the resonant cavity 50 through a suitable coupling device represented at 54. This particular coupling is a 10 db directional coupler having a movable short in the end of the main arm. It will be understood that the microwave pulses may be introduced into the resonant cavity 50 through other coupling devices such as the usual coupling iris.

A spark-gap of the type illustrated in FIGURE 1 is located within the arm **52*b* of the hybrid coupler and is represented at 56, the arm 52*b* forming a continuation of the arm 52*a* and being terminated by a movable short. The DC trigger pulses are supplied to the spark-gap 56 from a suitable source represented at 57**.

A third arm **52*c* of the hybrid 52 is terminated in a movable short, and the fourth arm 52*d*** is connected to supply microwave energy to a high power load represented at L.

A monitoring coupler MC may be inserted in the resonant cavity and connected to a suitable detector and oscilloscope, but this monitoring feature is not essential.

The movable shorts are adjusted to maximize the energy storage in the cavity. The switch assembly, in the unfired state, simply acts as a terminating short circuit for one end of the cavity. When a discharge is triggered in the spark-gap, the stored energy in the cavity is discharged into the high power load L terminating the hybrid arm **52*d***.

Assuming an input microwave pulse of approximately 4 microseconds duration, it is possible to reduce the duration of this pulse at the output of the hybrid coupler to a very small fraction of four microseconds, for example, to a duration of the order of 50 nanoseconds. The duration of the output pulse is determined by the time required for the input pulse to travel the length of the cavity and return to the input end. Accordingly, the duration may be controlled by changing the length of the cavity. The net result of the switching operation is that, in addition to the pulse compression (shortening of pulse duration), there is a marked increase in peak power which may be of the order of ten db. The increase in amplitude of the output pulse is obtained by reason of the storage of microwave energy within the resonant cavity 50 during the initial portion of the input microwave pulse. The striking of the spark releases the stored energy in an output pulse of a smaller number of cycles but of greatly increased amplitude. The wave form of the shortened output pulse is shown in FIGURE 2*a*.

The application of the DC trigger pulse must be properly timed with respect to the application of the microwave pulse WP. The trigger pulse is applied after the transient period and as soon as a steady state condition is established in the cavity.

By proper design of the switching arrangement, it is possible to obtain pulse rates up to 10,000 p.p.s.

Instead of using a network of the hybrid type shown at 52, it is possible to use other forms of 4-port networks, such as a magic-T.

FIGURE 3 is very similar to FIGURE 1 and shows, as does FIGURE 1, a rectangular wave guide 10 but of substantially larger dimensions than the one shown in FIGURE 1. In order to keep the amount of DC power within bounds, the gap between the wall electrodes 20 and 22 is split between a pair of trigger electrodes **24*a* and 24*b* and is further split by a grounded electrode 25**. The operation of the switch shown in FIGURE 3, however, will be identical to the one shown in FIGURE 1.

From the foregoing, it will be apparent to those skilled in this art that there is herein shown and disclosed a new and useful microwave spark-gap which will have utility wherever rapid switching of high microwave power pulses of varying pulse widths is desired. Specific embodiments of the basic switch structure as it is applied to rectangular wave guides have been described with reference to the figures of drawing, but the application is not limited to rectangular wave guides and, in fact, may be used in wave guides and/or high frequency transmission lines of any configuration. Applicants, therefore, claim the benefit of a full range of equivalents within the scope of the appended claims.

We claim:

1. A microwave spark-gap switch comprising:

(a) a uniconductor transmission line wave guide supportive of electromagnetic energy in a particular frequency range and having an ionizable gas therein;

(b) a pair of opposed electrodes mounted on and electrically connected to opposing walls of said wave guide;

(c) at least one trigger electrode also supported within said wave guide from another wall thereof, insulated therefrom and substantially centered between said pair of electrodes, all three electrodes lying substantially on a common axis;

(d) and a high energy source of pulsed D.C. voltage connected between said trigger electrode and said pair of electrodes.

2. A microwave control switch comprising: a wave guide section formed of tubular uniconductor and supportive of electromagnetic energy in a particular frequency range, said guide having an ionizable gas therein, a pair of spark-gap electrodes mounted inside of said tubular conductor on wall sections positioned on opposite sides of the axis of said section, said spark-gap electrodes having facing surfaces which are rounded; a trigger electrode mounted midway between said spark electrodes and supported by a conductive rod extending out of said wave guide section in a plane normal to the common axis of the two spark electrodes, said rod being insulated from the wave guide section, and said trigger electrode having rounded surfaces facing each of said spark electrodes, said electrodes lying substantially on a common axis.

References Cited

UNITED STATES PATENTS

| | | | |
|---|---|---|---|
| 2,235,399 | 3/1941 | Diehl | 307—108 |
| 2,777,972 | 1/1957 | Whitmore et al. | 315—39 |
| 2,807,714 | 9/1957 | Foin | 333—13 X |
| 2,903,623 | 9/1959 | Walker | 313—198 X |
| 3,188,514 | 6/1965 | Cobine | 315—330 |

HERMAN KARL SAALBACH, *Primary Examiner.*

P. L. GENSLER, *Assistant Examiner.*